M. VANDAL.
MACHINE FOR CUTTING CINEMATOGRAPHIC STENCILS.
APPLICATION FILED AUG. 21, 1913.

1,223,539.

Patented Apr. 24, 1917.
2 SHEETS—SHEET 1.

Witnesses:

Inventor
Marcel Vandal
By
Attorneys

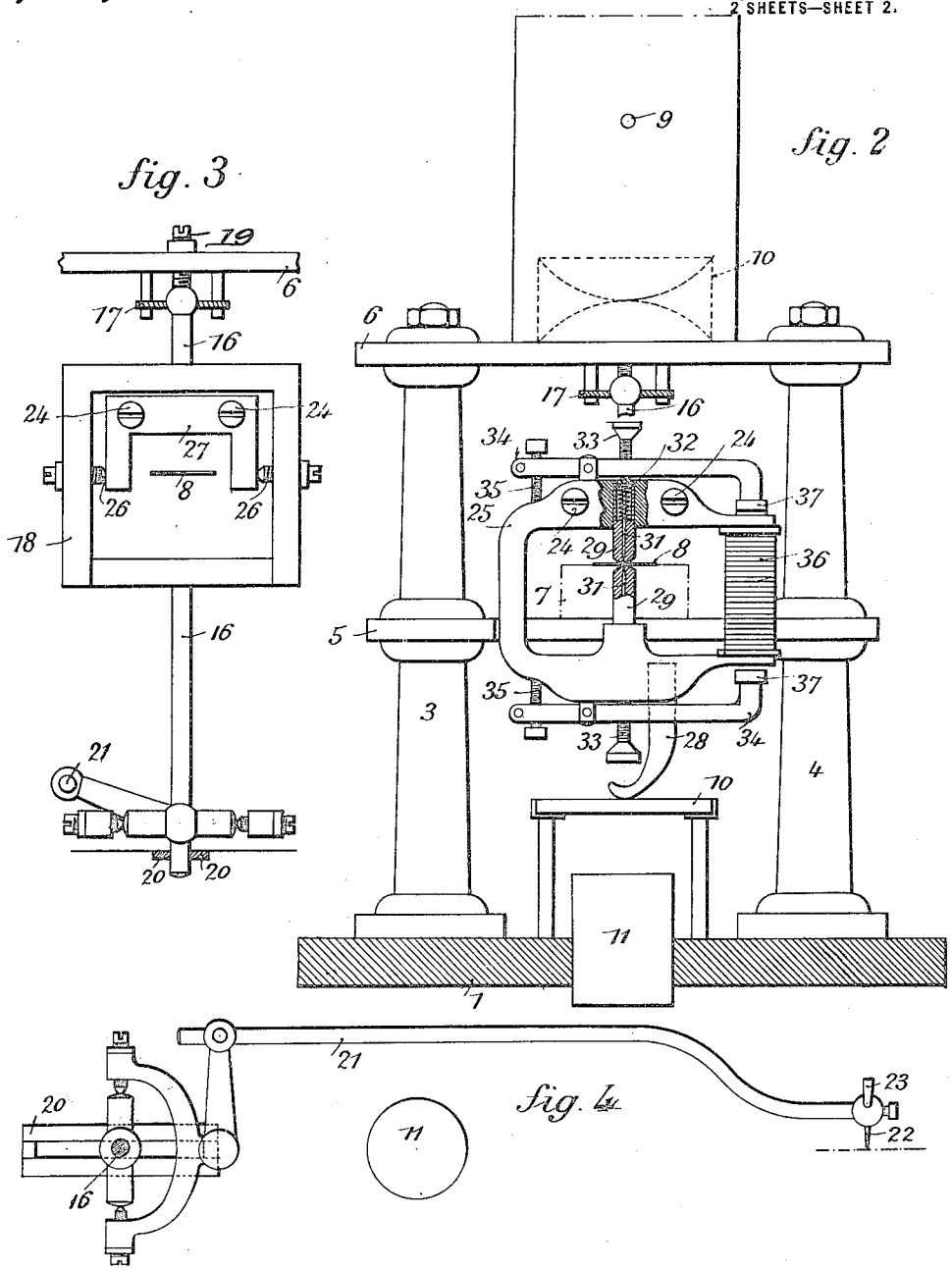

UNITED STATES PATENT OFFICE.

MARCEL VANDAL, OF PARIS, FRANCE.

MACHINE FOR CUTTING CINEMATOGRAPHIC STENCILS.

1,223,539. Specification of Letters Patent. Patented Apr. 24, 1917.

Application filed August 21, 1913. Serial No. 785,878.

*To all whom it may concern:*

Be it known that I, MARCEL VANDAL, a citizen of the Republic of France, residing at 12 Rue Gaillon, Paris, in the Republic of France, engineer, have invented certain new and useful Improvements in Machines for Cutting Cinematographic Stencils, of which the following is a specification.

This invention relates to a machine for cutting films for the purpose of making stencils suitable for the mechanical coloring of other films designed to be projected in colors.

For the purpose of cutting the stencil film use is generally made of a cutting tool which is connected by a pantograph with a loose point with which the operator follows the enlarged image produced by another film serving as a pattern.

According to this invention, it is the pattern film itself, that is to say, the one the views of which are projected and followed by the tracer point, which is cut out and which will serve as the stencil. The cutting tool, operated by the pantograph, then cuts, not the part of the film which is actually projected and of which the image is followed by the operator, but a part adjacent to the place to be cut out and which has been projected at a previous operation. Of course, the traces made by the cutting tool at one place of the film cannot coincide with the contours of the image placed at the same spot, but that is of no importance as the film is only cut out for the purpose of making a stencil.

It is expedient to cut out the film which is projected itself, and preferably the part of such film which is nearest to the image projected, for the purpose of eliminating as much as possible the errors due to the variations of the distance which separates the perforations and the like, which exist in all films, such errors having the effect of producing when coloring gaps or colored fringes which ought not to exist.

So the present machine is so fitted that the cutting tool will be positioned to cut out an image of the film at the same time that the source of light is projecting the following image on to the translucent glass.

Such machine presents other features as well as this one.

To cut out the film easily and exactly, the pantograph must have neither play nor sagging while having however great freedom of movement.

For such purpose, use is made of a pantograph which comprises a well known oscillatory rod hanging from a universal joint and with which guiding and tracing points are connected. According to this invention, the swinging rod is guided in a plane always vertical, for instance by means of a slide-way and is so secured as to be enabled to turn around its own axis; the guiding and tracing points are then secured to arms which are articulated to such rod by means of pivot screws. Such screws form axes parallel to each other and which are at right angles to the rod, and around which the rod can swing freely and without any play so that the guiding and tracing points are held exactly in a same plane with the rod. This result is obtained even if the rod has transversal play in its slide-way, so that the only play and friction which have to be taken into account are those of the universal joint of the rod and those of the pivot screws carrying the guide arms of the tracing and guiding points; it is easy to render these of no importance.

One embodiment of this invention and which incorporates all these features is shown diagrammatically in the accompanying drawings, in which:—

Figs. 2 and 3 are front and rear detail elevations respectively of the machine.

Fig. 4 is a sectional detail plan on the line A—A of Fig. 1.

Figures 1, 5:
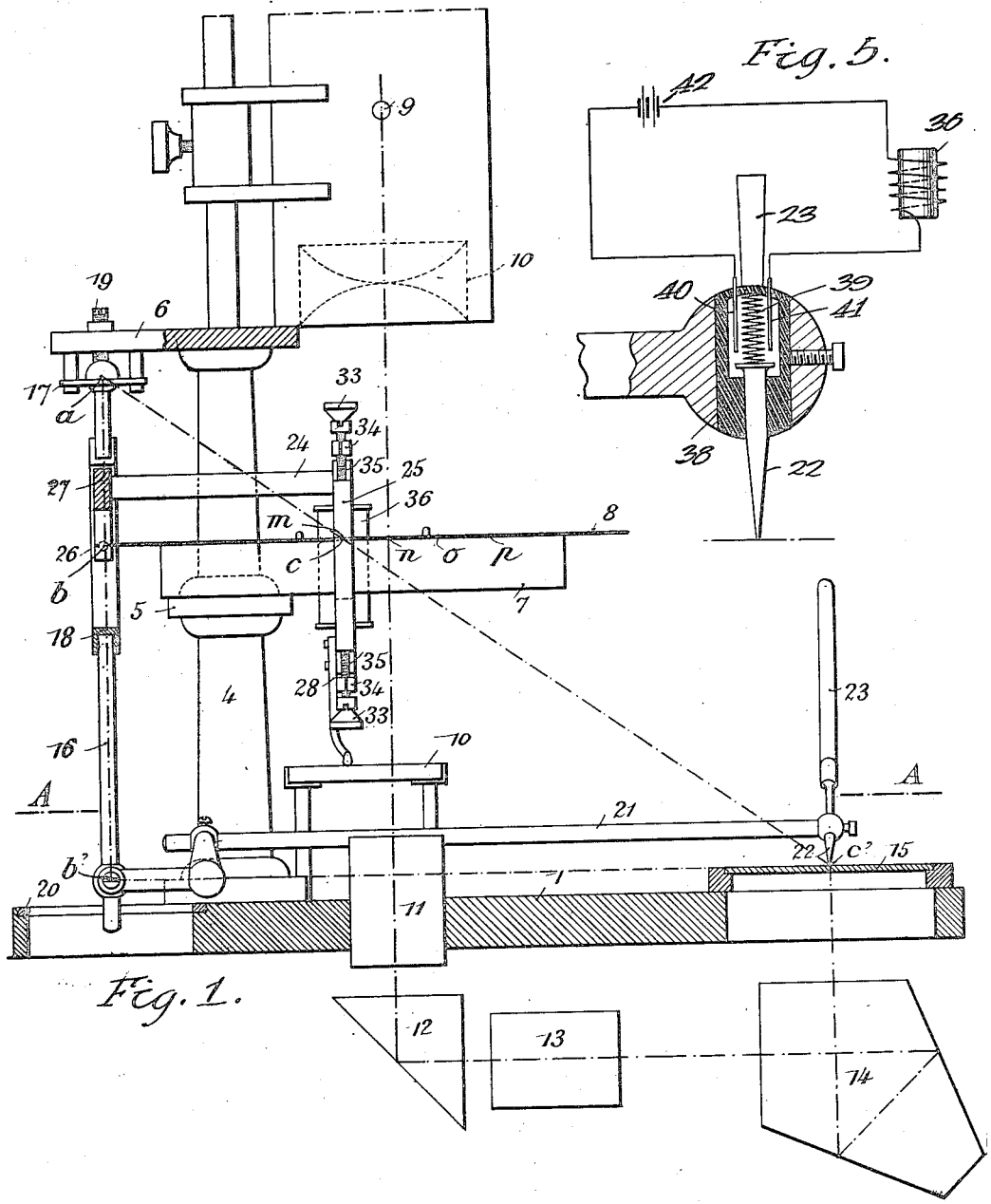
Figure 1 is a side elevation of the machine.
Fig. 5 is a diagrammatic view showing the electrical connections.

On a cast-iron table 1 are secured two standards 3 and 4 braced by the plates 5 and 6.

The plate 5 carries, between the standards, an open-work table 7. Such table is shown in dotted lines in Fig. 2. The film 8 which is to be cut out can be moved forward or backward on the table 7 to the extent of one image each time in any suitable way.

The luminous rays issuing from a point 9 are assembled by a condenser 10, pass through the film 8, a glass 10, an objective-glass 11, a triangular or single reflection prism 12, an objective-glass 13, a pentagonal or double reflection prism 14 and come to a stop on the tarnished or translucent glass 15 where the image appears enlarged.

The reducing device connecting the loose point 22 with the cutting tool is composed of a vertical rod 16 carrying a rectangular frame 18.

A steel ball is secured to the rod 16 and rests in a ring 17 secured by braces to the plate 6; a screw 19 having a lock-nut allows of minimizing the play of such ball.

The rod 16 can only move forwardly and backwardly, its lower end being guided by the gaged groove provided between the steel rulers 20.

A horizontal steel rod 21 is connected with the rod 16 by a yoke pivoted to an axis associated with the said rod 16. The other end of rod 21 is provided with a point 22 and with a handle 23 whereby the operator follows the projected image.

In the frame 18, between two pivot screws 26, is pivoted a support 27, which is rigidly connected to a front frame 25 by means of the braces 24. The frame 25 is supported by an arm 28 slidable on the stationary glass 10.

Any movement of the point 22 is repeated by the frame 25 with the selected reduction, which corresponds to the ratio of the areas of the triangles $a$, $b$, $c$ and $a$, $b'$, $c'$ (see Fig. 1).

Two tubes 29 secured in the frame 25 leave between their rounded ends the space necessary for the passage of the film 8. Within such tubes are slidable two steel rods 31 having convergent ends, and two spiral springs 32 tend to hold such rods separated and bearing against micrometrical screws 33 carried by the levers 34.

The distance between these levers, which are pivoted to the frame 25, is limited by micrometrical screws 35. An electro-magnet 36 also carried by the frame 25 attracts two pallets of soft iron 37 and through the medium of the levers 34 and of the screws 33 thus brings the rods 31 toward one another in causing their convergent tips to bear against the opposite faces of the film. These conical tips then scratch both the faces of the film deep enough to allow of the images thus traced being readily removed from said film, in letting the inner parts fall.

An electric contact is so combined with the point 22 as to send a current into the electromagnet 36 each time that the said point is brought to bear against the glass 15. The current is broken when the point no longer touches the glass and the sharp cones disappear again into the tubes 29. The electrical contact and connections may be arranged as shown in Fig. 5. The tracer point 22 is movable in an insulating casing 38 and is pressed on by a light spring 39. When the point 22 is brought to bear against the glass 15 the spring is compressed and the point is moved inward bridging the contacts 40 and 41 which are respectively connected with the battery 42 and the electromagnet 36. When the tracer point is no longer in contact with the glass 15 the spring moves the tracer point away from the contacts thus breaking the circuit.

The points which scratch the film may be made of hardened steel or of precious stones or very hard artificial stones, or the like.

The operation of the machine is as follows:—

Assuming that $m$ is the image which lies under the cutting tool and that $n$, $o$, $p$, are the next of following images, the loose point 22 is moved by the operator along the contours of the enlarged image which is projected onto the tarnished glass 15 by means of the luminous rays from the point 9 and passing through the part $n$ of the film. When the part $m$ is cut out, the part $n$ will be advanced under the tool 31 and the view located on $o$ will be projected in its turn onto the glass 15, and so on.

As will be understood, the structural arrangements shown herein are only given by way of example and may be modified without departing from the essential features of this invention. More particularly, the reducing system may be provided with a balancing device which will hold the same in balance indifferently in all positions; instead of the electro-magnet, any suitable mechanical means may be used for the purpose of moving the points which scratch the film nearer together or farther away from one another.

Claims:

1. A machine for cutting cinematographic stencils comprising an open-work table adapted to support a film, a translucent screen, cutting means adapted to cut out a part of the said film on the said table, projecting means whereby to project onto such screen a part of the same film at a short distance from the aforesaid part, and means connected with the cutting means and adapted to be led by hand onto such screen and to move proportionally the said cutting means.

2. A machine for cutting cinematographic stencils comprising a translucent screen, a source of light, projecting means adapted to project luminous rays of such light onto the screen, a pantograph, tracing means connected with a movable point of such pantograph and adapted to move onto the said screen, cutting means connected with another movable point of such pantograph, and an open-work table adapted to guide a film through the said luminous rays and through the field of action of the cutting means, the projecting means and the cutting means being so adapted that the two parts of the film exposed respectively to the action of such means will be different yet not far from one another.

3. A machine for cutting cinematographic stencils comprising the combination of a fixed support, a fixed guide having a horizontal groove, a rod having one end articulated to the said fixed support and its opposite end engaged in the said groove, such ends being so adapted that the said rod can turn around its own longitudinal axis and can oscillate in the plane which this axis forms with that of the groove, a fixed screen located perpendicularly to the last named plane, an open-work table parallel to such screen, tracing means, a connection between the tracing means and a part of said rod, the tracing means being adapted to be moved by hand on the said screen, cutting means and a connection between the cutting means and another part of the rod, the cutting means being adapted to move on the said table.

4. A machine for cutting cinematographic stencils comprising the combination of a fixed support, a fixed guide having a groove, a rod having one end articulated to the said fixed support and its opposite end engaged in the said groove, such ends being so adapted that the said rod can turn around its own longitudinal axis and can oscillate in the plane which this axis forms with that of the groove, two pairs of conical pivots fastened to the said rod on two lines perpendicular with respect to the axis of this rod and parallel with respect to one another, guiding means secured to one of said pairs of pivots and cutting means secured to the other of said pairs.

5. In a machine for cutting cinematographic stencils, a film-cutting means, a projecting means, a screen, a stylus mounted to be moved relatively to the screen to trace portions of a projected picture, a support on which a film may be positioned for its pictures to be projected by the projecting means and for the film to be cut by the cutting means, and means controlled by the movements of the stylus to govern the said cutting means.

6. In a machine for cutting cinematographic stencils, a projecting means, a film-cutting means to cut the film and form the stencil, an open work table on which a film may be brought in position to be projected and into position to be cut by the cutting means, and means for receiving the projected picture.

7. In a machine for cutting cinematographic stencils, a film-cutting means, a screen adapted to receive a projected picture, a stylus mounted to be moved relatively to the screen to trace portions of a projected picture, and means controlled by the stylus for governing the cutting means.

In testimony, that I claim the foregoing as my invention I have signed my name in presence of two subscribing witnesses.

MARCEL VANDAL.

Witnesses:
HANSON C. COXE,
MAURICE ROUX.